Feb. 20, 1962  M. M. WINDSOR ET AL  3,021,735
WORK LOCATING AND CLAMPING MECHANISM
Filed March 9, 1959  2 Sheets-Sheet 1

INVENTORS
MEREDITH M. WINDSOR
HERBERT R. LINCOLN
BY Whittemore, Hulbert
& Belknap
ATTORNEYS

INVENTORS
MEREDITH M. WINDSOR
HERBERT R. LINCOLN
BY
ATTORNEYS

United States Patent Office 3,021,735
Patented Feb. 20, 1962

3,021,735
WORK LOCATING AND CLAMPING
MECHANISM
Meredith M. Windsor and Herbert R. Lincoln, Detroit,
Mich., assignors to Star Cutter Company, Farmington
Township, Mich., a corporation of Michigan
Filed Mar. 9, 1959, Ser. No. 798,104
19 Claims. (Cl. 77—62)

The present invention relates to work locating and clamping mechanism.

It is an object of the present invention to provide a work holding device including flexible clamping jaws, work locating abutments, and means for moving the jaws simultaneously into engagement with the work locating abutments, and a work piece to locate and clamp the work accurately in fixed location with reference to the abutments.

It is a further object of the present invention to provide a work locating and clamping mechanism for fixedly clamping elongated cylindrical work pieces in accurately located position comprising a pair of cylindrical locating abutments, means for moving a cylindrical work piece into approximately axial alignment with the abutments, a pair of flexible clamping jaws having end portions engageable with the abutments to locate the jaws accurately, the intermediate portions of the jaws being yieldably displaceable into engagement with intermediate portions of the work piece.

Other objects and features of the invention will become apparent as the description proceeds, especially when taken in conjunction with the accompanying drawings, illustrating preferred embodiments of the invention, wherein:

FIGURES 3 is a front elevational view of a clamping jaw.

FIGURE 4 is a sectional view of the jaw taken on the line 4—4, FIGURE 3.

Figure 1:
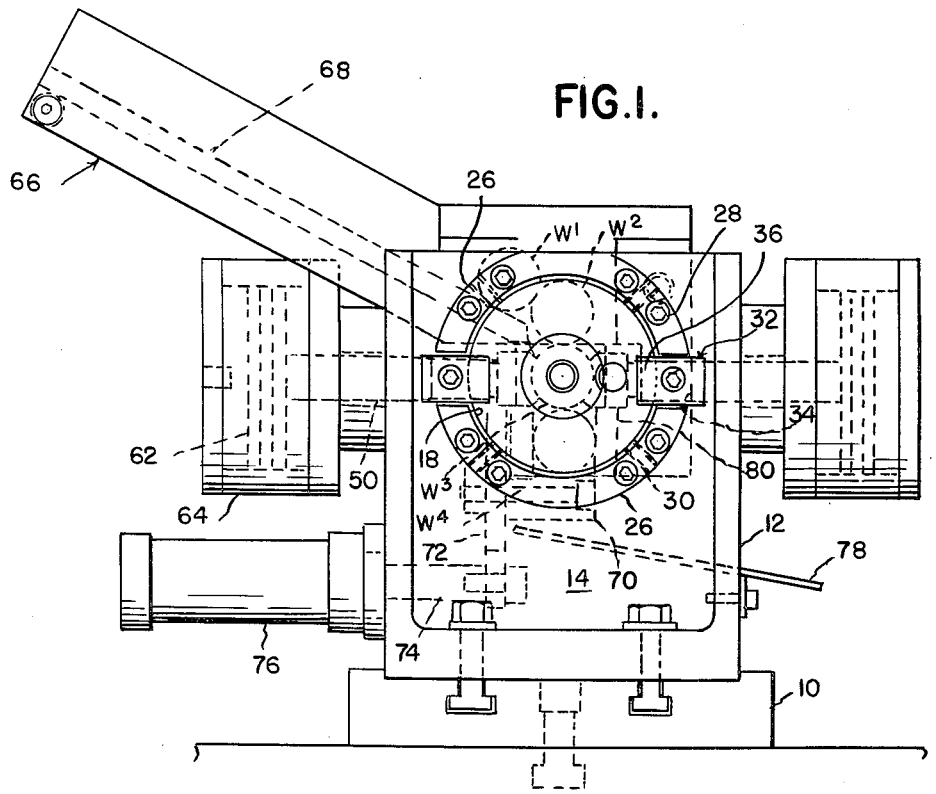
FIGURE 1 is a side elevation of a mechanism constructed in accordance with the present invention.

Referring now to the drawings, the mechanism comprises a stationary base plate 10 on which are adjustably mounted a pair of pedestals 12 each of which includes a flat plate portion 14 and a pair of webs 16. The plate portions 14 are provided with enlarged circular openings 18 in which are located annular bushing plates indicated generally at 20, having circular portions 22 received with substantial clearance in the openings 18, and flanges 24 adapted to engage the outer surface of the plate portions 14.

Means are provided for effecting very accurate adjustment of the bushing plates, since these constitute means for accurately determining the location of work pieces in the mechanism. For this purpose a pair of arcuate bushing plate retainers 26 are provided. Each of these retainers is bolted to the outer surface of the plate portion 14 as indicated at 28. Each of the retainers 26 is provided with a pair of adjusting set screws 30 adapted to extend to the inner surface of the retainers and to extend therebeyond to engage the outside diameter of the bushing plate 20. It will be readily apparent that by loosening the appropriate screws and tightening the remaining screws the bushing plates may be accurately adjusted and affixed in adjusted position.

After the bushing plates have been moved to the required position, they are clamped in this position by means of angle clamps 32 having legs 34 engageable with the outer surface of the plate portion 14 and other leg portions 36 overlying the edge portions of the bushing plates.

The bushing plates 20 are provided with central openings 38 in which are received locating abutments indicated generally at 40. In the present instance the locating abutments, or at least one of them, is in the form of a flanged tubular drill bushing so that it serves the function of locating a work piece with reference to the bushing and also as a means for guiding a drill into engagement with the work piece. For this purpose bushing 40 has the central opening 42 through which the drill extends. At the opposite side of the mechanism a similar drill bushing may be provided and the two drill bushings are in axial alignment and are spaced apart so as to be in juxtaposition to the ends of a cylindrical work piece and in axial alignment therewith.

The mechanism for accurately locating and clamping the cylindrical work pieces includes a pair of jaws 44 best seen in FIGURES 3 and 4. The jaws are elongated as shown and are provided with central openings 46 for receiving a screw 48 by means of which the jaws are attached to the ends of piston rods 50. The jaws are elongated, and include a generally rectangular body portion 54 dimensioned to provide for some lateral flexibility. At the ends and at two points intermediate the ends and center of the body 54, the jaws are provided with shaped vise portions, the vise portions at the ends of the jaws being indicated at 56 and the vise portions intermediate the ends of the jaws being indicated at 58. The vise portions are of identical shape, best illustrated in FIGURE 4, and include work and abutment engaging surfaces 60 herein disclosed as forming an included angle of approximately 120 degrees.

The piston rods 50 connect to pistons 62 movable in cylinders 64, the cylinders being connected to suitable means for applying fluid pressure to urge the jaws into engagement with work pieces as will subsequently be described.

The mechanism includes an inclined loading chute 66 having rails 68 along which a series of cylindrical work pieces such as shown at W1, W2, W3, and W4, are advanced into the mechanism. The chute includes side plates interconnected by spreader bars indicated at 69.

The mechanism includes a control block 70 adjustably carried by a vertical slotted arm 72 connected to a piston rod 74 extending from a piston (not shown) movable within a cylinder 76. Disposed beneath the block 70 is an inclined discharge chute 78.

Figure 2:
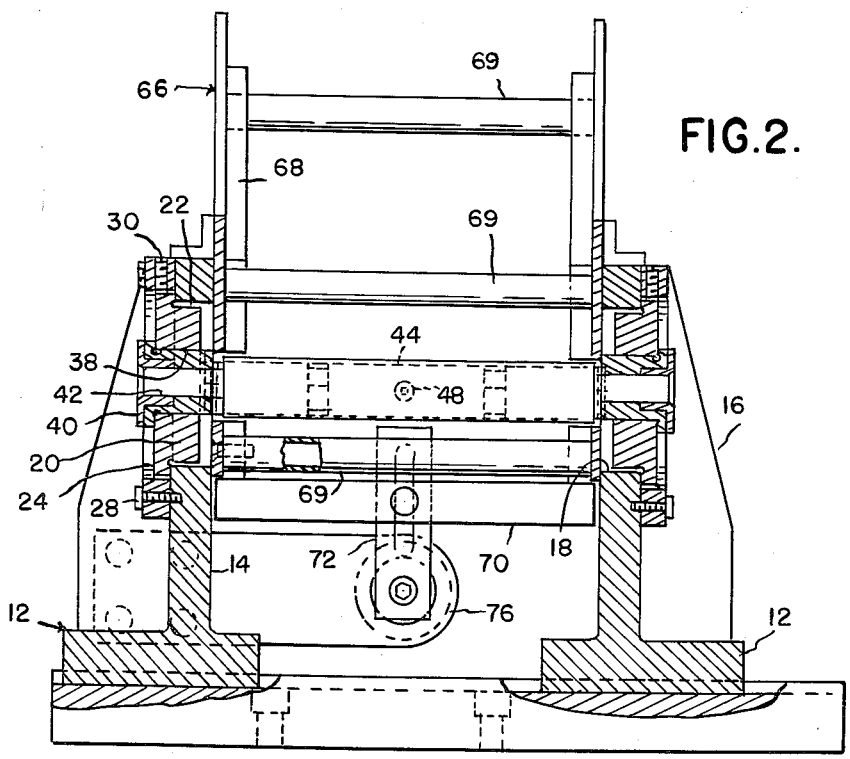
FIGURE 2 is a front elevation of the mechanism with parts broken away.

To understand the operation of the mechanism, assume that the cylinder 76 has positioned the block 70 in the position shown to engage the work piece W4. Suitable blocks 80 are in position to cooperate with the block 70 to support the work piece W4 in position. The next upper work piece W3 rests upon the work piece W4 and a further succession of work pieces W2, W1, etc. may lie along the rails 68 in position to advance serially into working position. With the parts in the position generally described, fluid pressure is admitted to the piston 64 to urge the elongated jaws 44 inwardly towards each other. The drill bushings of locating abutments 40 are preferably slightly larger in diameter than the work pieces. Accordingly, as the jaws are moved inwardly by fluid pressure the vises 56 at the ends thereof first engage inner ends of the locating abutments 40. As further pressure is applied the intermediate portions of the jaws are flexed inwardly so that the intermediate vise portions 58 engage portions of the work piece intermediate the ends thereof. The relationship is best illustrated in FIGURE 2.

Due to the inclination of the surfaces 60 of the work engaging vises, the work piece W3 is raised slightly from engagement with the work piece W4 and is accurately supported for a subsequent machining or other operation with reference to the locating abutments 40. At the same time of course all of the work pieces following the work piece W3, as for example work pieces W2, W1, etc., are moved slightly rearwardly and the block 70 at this time supports only the work piece W4. The cylinder 76 is now actuated to retract the block 70 and the work piece W4 which during operation of the mechanism, represents a finished work piece, drops to the discharge surface 78 and rolls out of the mechanism.

Where the machining operation is a drilling operation at the end of the work piece, it will be observed that the work locating abutments 40 serve the dual function of locating the work piece in a bolted position and also guiding the drill tool into proper engagement with the work piece. Obviously, if the operation involves drilling at both ends of the work piece, drill guides or bushings 40 will be provided at both ends. If the operation involves drilling only one end of a work piece, one of the abutments or bushing 40 may be solid.

Following the machining operation, and after the block 70 has been restored to the position shown in FIGURE 1, the jaws are retracted and the finished work piece drops down into engagement with block 70. All of the following work pieces advance one step and remain in this position until moved slightly rearwardly by upward movement of the next work piece engaged by the jaws 44.

Figure 5:
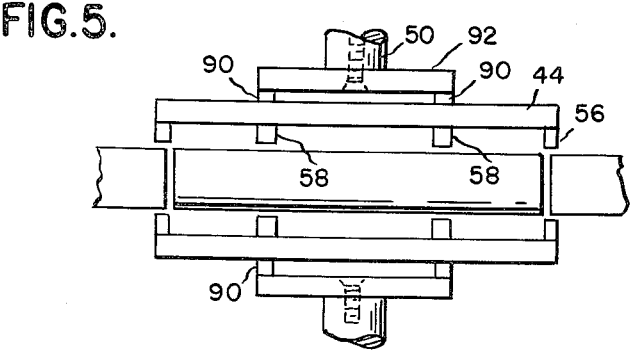
FIGURE 5 is a diagrammatic view illustrating a modification of the present invention.

Referring now to FIGURE 5 there is shown a modification of the invention in which the flexible jaws 44 are provided with abutments 90 in alignment with the work engaging vise portions 58 thereof. The piston rods 50 in this case are each provided with a rigid member 92 engaging the projections or abutments 90 so that the thrust of the piston rod is applied directly to the work engaging vise portions 58 through the projections 90. This prevents a tendency to bow the flexible jaws which might tend to move the abutment engaging vise portions 56 out of accurate locating engagement with the abutments 40.

While the illustrated application of the present invention is the location and support of elongated cylindrical work pieces, it will of course be apparent that the inventive concept may be applied to supporting work pieces of other and quite different shapes. The important feature of the present invention is the use of clamping members adapted to engage simultaneously with a work piece and with work locating abutments so as to clamp and support the work piece in a position determined exactly by the location of the abutments.

The drawings and the foregoing specification constitute a description of the improved work locating and clamping mechanism in such full, clear, concise and exact terms as to enable any person skilled in the art to practice the invention, the scope of which is indicated by the appended claims.

What we claim as our invention is:

1. In a machine tool, work locating and support means comprising a pair of work gripping members movable toward and away from each other, a fixed locating member, said work gripping members being simultaneously engageable with said locating member and a work piece, said locating member having a portion therof shaped to operate as a tool guide.

2. In a machine tool, work locating and support means comprising a pair of work gripping members movable toward and away from each other, said work gripping members having confronting V-shaped recesses for engagement with cylindrical work pieces, a fixed work-locating member having an axis parallel to the movement of said work gripping members and in axial alignment with the longitudinal axis of a cylindrical work piece, said work gripping members being simultaneously engageable with said locating member and the work piece.

3. In a machine tool, work locating and support means comprising a pair of flexible work gripping members movable toward and away from each other, a fixed work-locating member having an axis parallel to the movement of said work gripping members and in axial alignment with the longitudinal axis of a cylindrical work piece, said work gripping members being simultaneously engageable with said locating member and the work piece, and independent actuating means for advancing and retracting said work gripping members.

4. In a machine tool, a pair of cylindrical work-locating members spaced apart to receive an elongated cylindrical work piece therebetween, the work piece having its longitudinal axis in axial alignment with the axes of said work locating members, means for advancing a work piece into approximate alignment between said locating members, a pair of elongated work gripping members movable toward and away from a work piece between said locating members in a direction substantially parallel to the axes of said work locating members, said work gripping members having means engageable with said locating members and with a work piece to effect accurate location of a work piece with reference to said locating members, said gripping members being slightly flexible to tightly clamp the work piece therebetween.

5. In a machine tool, a pair of work-locating members spaced apart to receive an elongated work piece therebetween in alignment therewith, means for advancing a work piece into approximate alignment between said locating members, a pair of elongated work gripping members movable toward and away from a work piece between said locating members, said work gripping members having confronting V-shaped recesses engageable with said locating members and with a work piece to effect accurate location of a work piece with reference to said locating members, said gripping members being slightly flexible to tightly clamp the work piece therebetween.

6. In a machine tool, a pair of cylindrical work-locating members spaced apart to receive an elongated cylindrical work piece therebetween, the work piece having its longitudinal axis in axial alignment with the axes of said work locating members, means for advancing a work piece into approximate alignment between said locating members, a pair of elongated work gripping members movable toward and away from a work piece between said locating members in a direction substantially parallel to the axes of said work locating members, said work gripping members having means engageable with said locating members and with a work piece to effect accurate location of a work piece with reference to said locating members, said gripping members being slightly flexible to tightly clamp the work piece therebetween, and independent means for actuating said work gripping members into and out of engagement with said locating members and a work piece therebetween.

7. In a machine tool, a pair of locating members spaced apart to receive an elongated work piece therebetween in alignment therewith, means for advancing a work piece into approximate alignment between said locating members, a pair of elongated work gripping members movable toward and away from a work piece between said locating members, said work gripping members having means engageable with said locating members and with a work piece to effect accurate location of a work piece with reference to said locating members, one of said locating members having a portion thereof shaped to operate as a tool guide.

8. In a machine tool, a pair of locating members spaced apart to receive an elongated work piece therebetween in alignment therewith, means for advancing a work piece into approximate alignment between said locating members, a pair of elongated work gripping members movable toward and away from a work piece between said locating members, said work gripping members having means engageable with said locating members and with a work piece to effect accurate location of a work piece with reference to said locating members, one of said locating members having an opening therethrough operable as a drill guide, and a drill head movable to advance a drill into and out of the opening.

9. In a machine tool, a chute for receiving a series of work pieces, a stop, said stop being movable into and out of the path of work pieces in said chute, a pair of jaws, fluid actuated means connected to each of said jaws for moving said jaws toward and away from each other in position to engage the work piece immediately adjacent the work piece supported by said stop, said jaws being slightly flexible to insure tight gripping of the work piece therebetween, means independent of said fluid actuated means for moving said stop out of the path of work pieces in said chute and returning said stop to position in such path while said jaws are in work engaging position.

10. In a machine tool, a chute for receiving a series of work pieces, a stop, said stop being movable into and out of the path of work pieces in said chute, a pair of jaws, fluid actuated means connected to each of said jaws for moving said jaws toward and away from each other in position to engage the work piece immediately adjacent the work piece supported by said stop, said jaws being slightly flexible to insure tight gripping of the work piece therebetween, means independent of said fluid actuated means for moving said stop out of the path of work pieces in said chute and returning said stop to position in such path while said jaws are in work engaging position, said jaws having camming surfaces effective to move the work piece engaged thereby away from the preceding work piece engaged by said stop.

11. In a machine tool, a chute for receiving a series of work pieces, a stop, said stop being movable into and out of the path of work pieces in said chute, a pair of jaws movable toward and away from each other in position to engage the work piece immediately adjacent the work piece supported by said stop, a locating member intermediate said jaws and engageable thereby during engagement of a work piece by said jaws to effect accurate location of the work piece, means for moving said stop out of the path of work pieces in said chute and returning said stop to position in such path while said jaws are in work engaging position.

12. In a machine tool, a chute for receiving a series of work pieces, a stop, said stop being movable into and out of the path of work pieces in said chute, a pair of jaws movable toward and away from each other in position to engage the work piece immediately adjacent the work piece supported by said stop, a locating member intermediate said jaws and engageable thereby during engagement of a work piece by said jaws to effect accurate location of the work piece, said jaws having confronting V-shaped recesses for simultaneous engagement with said locating member and a work piece, means for moving said stop out of the path of work pieces in said chute and returning said stop to position in such path while said jaws are in work engaging position.

13. In a machine tool, a chute for receiving a series of work pieces, a stop, said stop being movable into and out of the path of work pieces in said chute, a pair of jaws movable toward and away from each other in position to engage the work piece immediately adjacent the work piece supported by said stop, a locating member intermediate said jaws and engageable thereby during engagement of a work piece by said jaws to effect accurate location of the work piece, said jaws having confronting V-shaped recesses for simultaneous engagement with said locating member and a work piece, independent means connected to said jaws for moving said jaws toward and away from each other, means for moving said stop out of the path of work pieces in said chute and returning said stop to position in such path while said jaws are in work engaging position.

14. In a machine tool for working on elongated work pieces, a pair of locating members, means for positioning a work piece between said members in approximate alignment therewith, a pair of elongated jaws having portions shaped to engage said locating members and work piece simultaneously to position the work piece accurately with reference to said locating members, said jaws being slightly flexible to insure tight gripping of the work piece therebetween.

15. In a machine tool for working on elongated work pieces, a pair of locating members, means for positioning a work piece between said members in approximate alignment therewith, a pair of elongated jaws having concave V-shaped recessed portions shaped to engage said locating members and work piece simultaneously to position the work piece accurately with reference to said locating members, said jaws being slightly flexible to insure tight gripping of the work piece therebetween.

16. In a machine tool for working on elongated work pieces, a pair of locating members, means for positioning a work piece between said members in approximate alignment therewith, a pair of elongated jaws each having a pair of concave V-shaped recesses spaced apart longitudinally thereof, and concave V-shaped recesses adjacent the ends thereof for engagement with said locating means, said jaws being slightly flexible to insure tight gripping of the work piece therebetween, and bridging means for applying pressure to said jaws adjacent said pair of recesses to maintain the end recesses in contact with said locating members.

17. In a machine tool, work locating and support means comprising an elongated flexible work gripping member, a fixed cylindrical work locating member having an axis in longitudinal alignment with the axis of a cylindrical work piece, said flexible work gripping member being adapted to be moved in a direction parallel to the axes of said work locating member and work piece so as to simultaneously engage said work locating member and tightly grip said cylindrical work piece to effect accurate location of the work piece with reference to the work locating member.

18. A structure as defined in claim 17 wherein said locating member has a portion thereof shaped to operate as a tool guide.

19. A structure as defined in claim 17 wherein said work gripping member has a V-shaped recess for engagement with the cylindrical work piece.

References Cited in the file of this patent
UNITED STATES PATENTS

| | | |
|---|---|---|
| 1,290,874 | Baker et al. | Jan. 14, 1919 |
| 1,378,989 | Wood | May 24, 1921 |
| 1,689,022 | Graham | Oct. 23, 1928 |
| 1,951,093 | Johnston | Mar. 13, 1934 |
| 2,796,899 | Biro | June 25, 1957 |